United States Patent Office 3,388,105
Patented June 11, 1968

3,388,105
HARDENABLE COMPOSITIONS OF HARDENABLE EPOXY COMPOUNDS, PROCESSES OF HARDENING AND HARDENED EPOXY RESINS
Miklos Danielisz, Dusseldorf, and Manfred Dohr and Joachim Galinke, Dusseldorf-Holthausen, Germany, assignors to Lord Corporation, Erie, Pa., a corporation of Pennsylvania
No Drawing. Filed Sept. 30, 1965, Ser. No. 491,877
Claims priority, application Germany, Oct. 6, 1964, H 53,952
13 Claims. (Cl. 260—78.4)

ABSTRACT OF THE DISCLOSURE

This invention relates to a hardenable composition of matter capable of being hardened by heating to temperatures between about 80° C. and 200° C. which consists essentially of from about 25 parts to about 75 parts by weight of an epoxy compound having the formula

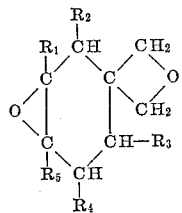

wherein $R_1$, $R_3$ and $R_5$ are members selected from the group consisting of hydrogen, halogen, lower alkyl and phenyl and $R_2$ and $R_4$ are members selected from the group consisting of hydrogen, halogen, lower alkyl, phenyl, and, when taken together, methylene, and the remainder to give 100 parts by weight of an organic acid compound selected from the group consisting of organic carboxylic acids having at least two carboxylic acid groups and carboxylic acid anhydrides thereof, as well as the hardened epoxy resins produced from the hardenable composition.

The synthetic resins can be used for preparation of shaped bodies, adhering, or coating.

The production of synthetic resins by a reaction between organic compounds containing more than one reactive epoxide group in the molecule and di- or poly-carboxylic acids or their anhydrides is known. Furthermore, hardened synthetic resins have also already been obtained from organic compounds containing two oxacyclobutane rings and di- or poly-carboxylic acids or their anhydrides. To the present time there have been no compounds known which contain a 1,2-epoxide group as well as an oxacyclobutane ring and can be reacted with the designated carboxylic acids or their anhydrides to make synthetic resins.

The present invention has for its object the obtention of an epoxy compound having the formula

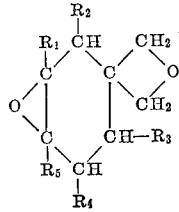

wherein $R_1$, $R_3$ and $R_5$ are members selected from the group consisting of hydrogen, halogen, lower alkyl and phenyl and $R_2$ and $R_4$ are members selected from the group consisting of hydrogen, halogen, lower alkyl, phenyl, and, when taken together, methylene.

Another object of the present invention is the development of a process for the production of a hardened synthetic resin which comprises reacting an epoxy compound having the formula

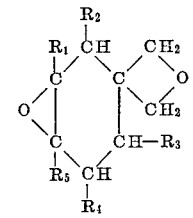

wherein $R_1$, $R_3$ and $R_5$ are members selected from the group consisting of hydrogen, halogen, lower alkyl and phenyl and $R_2$ and $R_4$ are members selected from the group consisting of hydrogen, halogen, lower alkyl, phenyl, and, when taken together, methylene, with an organic acid compound selected from the group consisting of organic carboxylic acids having at least two carboxylic acid groups and carboxylic acid anhydrides thereof at a temperature of between about 80° C. and about 200° C. for a time sufficient to harden and recovering said hardened synthetic resin.

A further object of the present invention is the development of a process for the production of a solid, low molecular weight synthetic resin which is viscous at temperatures between about 80° C. and about 120° C. and which is capable of being hardened at temperatures between about 150° C. and 200° C. which comprises reacting an epoxy compound having the formula

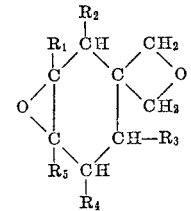

wherein $R_1$, $R_3$ and $R_5$ are members selected from the group consisting of hydrogen, halogen, lower alkyl and phenyl and $R_2$ and $R_4$ are members selected from the group consisting of hydrogen, halogen, lower alkyl, phenyl, and, when taken together, methylene, with an organic acid compound selected from the group consisting of organic carboxylic acids having at least two carboxylic acid groups and carboxylic acid anhydrides thereof at a temperature of between about 80° C. and about 120° C. for a time sufficient to form a viscous mass, cooling the reaction mixture and recovering said solid, low molecular weight synthetic resin.

A yet further object of the present invention is the production of a hardenable composition of matter capable of being hardened by heating to temperatures between about 80° C. and 200° C. which comprises from about 25 parts to about 75 parts by weight of an epoxy compound having the formula

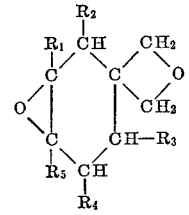

wherein $R_1$, $R_3$ and $R_5$ are members selected from the group consisting of hydrogen, halogen, lower alkyl and phenyl and $R_2$ and $R_4$ are members selected from the group consisting of hydrogen, halogen, lower alkyl, phenyl, and, when taken together, methylene, and the remainder to give 100 parts by weight of an organic acid compound consisting of organic carboxylic acids having at least two carboxylic acid groups and carboxylic acid anhydrides thereof.

These and other objects of the present invention will become more apparent as the description thereof proceeds.

The subject of the present invention is thus both process for preparation of synthetic resins by reaction of bifunctional organic compounds containing reactive epoxide groups with dicarboxylic acids and/or polycarboxylic acids or their anhydrides during molding at elevated temperatures and the compounds per se, as well as the hardened resins and compositions. The new process is characterized in that compounds of the general formula

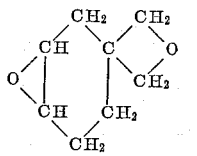

I wherein the carbon atoms of the cyclohexane rings can also be substituted are brought into reaction with dicarboxylic acids and/or with polycarboxylic acids or their anhydrides. Lower alkyl radicals, particularly the methyl radical, one or more phenyl radicals, chlorine- or bromine-atoms come into the picture as examples of substituents on the cyclohexane ring. There could also be two carbon atoms connected by a methylene bridge. Particularly useful are epoxy compounds having the formula

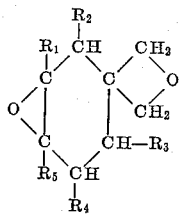

wherein $R_1$, $R_3$ and $R_5$ are members selected from the group consisting of hydrogen, halogen, lower alkyl and phenyl and $R_2$ and $R_4$ are members selected from the group consisting of hydrogen, halogen, lower alkyl, phenyl, and, when taken together, methylene.

The starting materials for the compounds of the preceding general formulas put into the new process are new substances. They can be prepared in a manner, which by itself is known, by the epoxidation of compounds which correspond to the following general Formula II

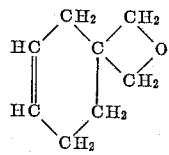

II and in which the carbon atoms of the cyclohexane ring can be substituted by the groups mentioned above.

The oxacyclobutane derivatives containing a double bond, corresponding to the preceding Formula II, are known or can be prepared in known manner. The starting material used for the unsubstituted oxacyclobutane derivative of cyclohexene is the diol formed by reaction of cyclohexene aldehyde with formaldehyde. This diol would be converted into the corresponding oxetane via either the p-toluenesulfonic acid ester (see U.S. Patent 3,110,-688) or via the cyclic carbonic acid ester (see U.S. Patent 2,924,607). If one chooses a substituted in place of the unsubstituted cyclohexene aldehyde, then one obtains the corresponding substituted oxacyclobutane derivative of Formula II. For example, the following cyclohexene aldehydes containing an epoxidizable double bond can serve as starting materials:

2-methylcyclohexene-4-aldehyde
2,6-dimethylcyclohexene-3-aldehyde
2,5,6-trimethylcyclohexene-3-aldehyde
2-phenylcyclohexene-4-aldehyde
2,5-endomethylenecyclohexene-3-aldehyde
4-chloro-cyclohexene-3-aldehyde The epoxidation of the oxacyclobutane derivatives of the general Formula II is accomplished with known epoxidizing agents like, for example, peracetic acid, performic acid, perbenzoic acid, monoperphthalic acid or also by means of peracids formed in situ. In this, suitable inert solvents are used, as for example chloroform, methylene chloride, carbon tetrachloride, acetic acid, formic acid, ethyl acetate, acetone or benzene and the like. In addition, one can add to the reaction mixture in known manner materials which buffer the pH value against shifting, for example sodium acetate or melamine. The reaction temperatures in general lie between about $-20$ and $+50°$ C., preferably between $-10$ and $+25°$ C. The peracid, which in general is present in an excess of about 1.2 to 1.5 mols of peracid per mol, is consumed after a time interval of about 2 to 10 hours, generally 4 to 7 hours.

The work-up occurs in known manner. Optionally one can distill the raw product of the general Formula I under lowered pressure for further purification. In case distillation is not possible, one can purify the new compounds by other known art, for example through recrystallization.

For accomplishing the process according to the invention, the epoxidized derivative of oxacyclobutane of the general Formula I is mixed with dicarboxylic acids and/ or with polycarboxylic acids or their anhydrides and warmed. For example, the following organic acid compounds selected from the group consisting of organic carboxylic acids having at least two carboxylic acids groups and carboxylic acid anhydrides thereof, can be utilized: phthalic acid, maleic acid, glutaric acid, dodecylsuccinic acid, tetra- and hexa-hydrophthalic acid, methyl-hexahydrophthalic acid, endomethylenetetrahydrophthalic acid, methylendomethylenehexahydrophthalic acid, pyromellitic acid, trimellitic acid, tetrachlorophthalic acid, hexachloroendomethylenetetrahydrophthalic acid, naphthalene dicarboxylic acid-1,8-adipic acid, azelaic acid. However, the carboxylic acid anhydrides are preferred for the process according to the invention for practical reasons. In the case where the acids named form no internal anhydride, such as tetrahydrophthalic acid anhydride or pyromellitic acid dianhydride, polymeric anhydrides can also be used, such as adipic acid polyanhydride, azelaic acid polyanhydride or hexahydroterephthalic acid polyanhydride. Finally, carboxylic acid anhydrides which contain further functional groups are also suitable, for example dichloromaleic acid anhydride, 3,6-epoxytetrahydrophthalic acid anhydride, and the like.

The amount of organic polycarboxylic acid or acid anhydride employed is between about 25% and 75% by weight of the reaction mixture. Preferentially an amount of about a mol equivalent of a compound containing two carboxylic acid groups or one internal carboxylic acid anhydride group is utilized per mol equivalent of the novel epoxy compounds of the invention.

The reaction according to the invention occurs at temperatures of about 80 to 200° C. The reaction time is dependent on the temperature used and the other conditions, like the chemical constitution of the epoxidized oxacyclobutane derivative and the designated di- and/ or polycarboxylic acids or their anhydrides. It amounts to about 4 to 40 hours.

It is particularly advantageous to carry out the process of producing the hardened compounds of the invention in two steps. Practically, one uses a reaction temperature of about 80–120° C. in the first step. At this relatively low temperature chiefly the three-membered or vicinal epoxide groups react and form intermediate products which are mostly viscous at the temperature range named. One can carry out further hardening at temperatures of about 150–200° C. immediately after formation of these viscous products. Shaped bodies thereby are obtained which show a particularly limited shrinkage in comparison with other shaped bodies prepared from known epoxide compounds and polycarboxylic acids or their anhydrides.

However, it is of particular advantage to cool down the reaction mixture after the formation of the intermediate product. The cooled product can be kept unchanged for a long time, that is, for months, at room temperature. The products which thereby are obtained are solid at room temperature. These products can be ground, for example, and optionally be converted into the finished synthetic resin at the elevated temperature mentioned of about 150–200° C. after the addition of additional materials, such as fillers, colorants, or plasticizers. Since essentially only the three-membered oxygen rings react in the first steps of the reaction because of the different reactivity, careful temperature control is not necessary in the preparation of the intermediate product. One obtains products of constant composition or like properties even when varying the reaction temperature within the critical range or when changing the dimensions of the apparatus used.

In addition, to shorten the reaction time for the preparation of the hardened resins, materials which accelerate the reaction between carboxylic acids or their anhydrides and three- and four-membered rings which contain oxygen can be added to the reaction mixture. These accelerators are, for example, tertiary amines and boron trifluoride-amine complexes. In addition, the alkali salts of phosphoric acid described in the copending, United States patent application Ser. No. 411,613, filed Nov. 16, 1964, now Patent No. 3,328,319, can be put in as accelerators. The materials mentioned, which accelerate the reaction, are utilized appropriately in amounts of about 0.1 to 0.5%, based on the weight of the mixture.

The synthetic resins of the invention can be used, for example, for preparation of shaped bodies, adhering, or coating.

The following specific examples are presented to illustrate the invention and to enable persons skilled in the art to better understand and practice the invention. It is to be understood however that they are not to be deemed limitative.

EXAMPLE I

Preparation of 6,7-epoxy-2-oxa-[4,6]-spirononane
($R_1=R_2=R_3=R_4=R_5=H$)

Over a period of ¼ hour at a temperature of −10° C., 16.7 gms. of peracetic acid dissolved in 50 ml. of chloroform were added dropwise to a solution of 24.8 gms. of 2-oxa-[4,6]-spirononene-6 in 80 ml. of chloroform while stirring and cooling. After discontinuing the cooling, the reaction mixture was slowly warmed to 25° C. with further stirring and kept 6 hours at this temperature. After that the reaction solution was washed several times with water and with a sodium bicarbonate solution as well as with a saturated sodium chloride solution. After drying over sodium sulfate, the solvent was distilled off in vacuum. An almost colorless oil weighing 16.5 gms. was obtained. This oil contained 9.6% vicinal epoxide oxygen (theoretical: 11.4%).

After distillation in vacuum 6,7-epoxy-2-oxa-[4,6]-spirononane was obtained in analytically pure form with the following characteristics:

Boiling point at 0.5 mm. Hg _____ ° C__ 70–71
Refractive index _____ $n_D^{20}$=1.4857
Vicinal epoxide oxygen _____percent__ 11.4

Analysis.—68.50 and 68.62% C., 8.32 and 8.60% H. Calculated for $C_8H_{12}O_2$: 68.54% C.; 8.64% H.

When a buffer is used in the epoxidation, the yields can be increased. Thus, from an otherwise analogously treated charge, 36 gms. of epoxidized oxacyclobutane derivative was obtained from 40 gms. 2-oxo-[4,6]-spirononene-6 with the use of 36.8 gms. of peracetic acid and a total of 250 ml. of chloroform by the addition to the reaction of 30 gms. of melamine.

EXAMPLE II

Preparation of 7,8-epoxy-2-oxa-5-methyl-[4,6]-spirononane ($R_1=R_2=R_4=R_5=H$, $R_3=CH_3$)

24.8 gms. of peracetic acid dissolved in 100 ml. of chloroform were added at −10° C. to a solution of 30 gms. of 2-oxa-5-methyl-[4,6]-spirononene-7 in 60 ml. of chloroform while stirring and cooling. Before the addition of the peracetic acid solution, 20 gms. of melamine were added to the chloroformic solution of the cyclohexenyl compound. One-half hour after the addition of the peracid, the reaction mixture was allowed to warm to 25° C. and allowed to rest 6 hours more at the same temperature.

After filtering off the melamine and washing with sodium bicarbonate solution and with saturated sodium chloride solution, the chloroform solution was dried over sodium sulfate. Following that, the chloroform was distilled off. The residue, 27 gms. of a colorless oil, possessed a vicinal epoxide oxygen content of 9.4% (theoretical: 10.4%). The raw product was purified by a single distillation. The analytically pure compound, 7,8-epoxy-2-oxa-5-methyl-[4,6]-spirononane, passed over between 90 and 93° C. at 1.7 mm. Hg. It soon solidified after the distillation to a white powder having a melting range of 35 to 40° C. Iodine number=0, vicinal epoxide oxygen content 10.3%.

EXAMPLE III

Preparation of a hardened synthetic resin 14 gms. of 6,7-epoxy-2-oxa-[4,6]-spirononane ($R_1=R_2=R_3=R_4=R_5=H$)

obtained according to Example I were worked up to a homogeneous mass with 15.4 gms. of hexahydrophthalic acid anhydride at 30° C. and shaped bodies thereof were poured. These were held 3 hours at 100° C. and 16 hours at 120° C. After this time the temperature was raised and held 5 hours at 170° C.

A light yellow hard shaped body was obtained with a ball indentation hardness of 1000 kilograms per square centimeter.

EXAMPLE IV

Preparation of a hardened synthetic resin 14 gms. of 6,7-epoxy-2-oxa-[4,6]-spirononane ($R_1=R_2=R_3=R_4=R_5=H$)

obtained according to Example I were mixed with 15.4 gms. of hexahydrophthalic acid anhydride and 0.06 gm. of a boron fluoride-ethanolamine complex, at 60° C. The mixture obtained was cast to a shaped body of 120 x 15 x 10 millimeters and held for 20 hours at 100° C. and an additional 8 hours at 170° C. A light yellow and hard test specimen was obtained.

EXAMPLE V

Preparation of a hardened synthetic resin 30 gms. of 6,7-epoxy-2-oxa-[4,6]-spirononane ($R_1=R_2=R_3=R_4=R_5=H$)

obtained according to Example I were mixed with 33.5 gms. of hexahydrophthalic acid anhydride and 0.15 gm. of the lithium salt of bis-α-hydroxytetrahydrobenzyl-phosphinic acid-tetrahydrobenzaldehyde acetal, at 40° C. and test bars of dimensions 120 x 15 x 10 millimeters were cast from the resulting mixture. The cast bodies were heated at rest for 18 hours at 120° C. and, after that, for 5 hours additional at 150° C.

Light yellow test bars were obtained which were not changed on exposure to the action of organic solvents for several days at room temperature, such as methyl alcohol, ethyl alcohol, chloroform, acetone, dioxane and dimethylformamide as well as 2 N hydrochloric acid, sulfuric acid, and caustic soda solution.

The ball indentation hardness amounted to 1500 kilograms per square centimeter.

EXAMPLE VI

Preparation of a hardenable composition 14 gms. (0.1 mol) of 6,7-epoxy-2-oxa-[4,6]- spirononane ($R_1=R_2=R_3=R_4=R_5=H$) obtained according to Example I were worked up to a homogeneous mass with 15.4 gms. (0.1 mol) of hexahydrophthalic acid anhydride at 30° C. The composition was viscous and pourable at this temperature. A hardened resin was obtained from this composition on heating to 100° C. to 170° C. for 24 hours as in Example III.

Addition of 0.2% of an accelerator such as a boron fluoride-ethanolamine complex can be made as in Example IV.

Preferably, however, 0.25% of an accelerator such as the lithium salt of bis-α-hydroxy-tetrahydrobenzylphosphonic acid-tetrahydrobenzaldehyde acetal having the formula

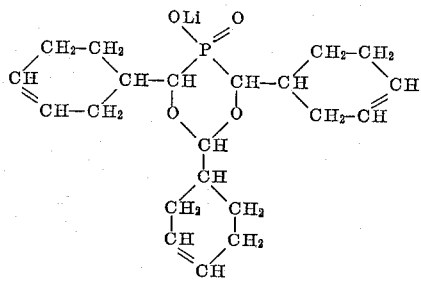

prepared acording to Ser. No. 411,613 is utilized as in Example V.

The compositions and hardened resins of the invention may also contain in addition to the epoxy compounds having a 6,7-epoxy-2-oxa-[4,6]-spirononane configuration, up to 70% by weight of the total amount of hardenable compounds of other conventional hardenable epoxide compounds such as glycide ethers of multihydric phenols, as for example bisphenol A, or glycide ethers of novolaks (non-hardenable phenol resins), also glycidyl ethers of di- or polyols, as for example butanediol or glycerin, also glycide esters such as phthalic acid diglycide ester, iso- or terephthalic acid diglycide ester, adipic acid-diglycide ester as well as glycide esters of cyanuric acid or isocyanuric acid. Other suitable epoxide compounds are epoxified olefins and cyclo-olefins such as vinylcyclohexenedioxide, also compounds containing two or more epoxidized cyclohexene radicals per molecule, e.g. 3,4-epoxyhexahydro - 6 -methyltetrahydrobenzyl-3',4'-epoxy-6'-methylhexahydrobenzoate or the diepoxide of the acetal of cyclohexene-aldehyde and 1,1-dimethylolcyclohexene, finally epoxidized esters of unsaturated fatty acids with multihydric alcohols or epoxidized polybutadiene.

EXAMPLE VII

Preparation of a hardened mixed epoxy resin 21.4 gms. of 6,7 - epoxy - 2 - oxa - [4,6] - spirononane ($R_1=R_2=R_3=R_4=R_5=H$) obtained according to Example I were mixed with 3.4 gms. of "Araldit F" (a commercial condensate containing epoxide groups obtained by the reaction of epichlorohydrin with diphenolpropane having an epoxy oxygen content of 8.2%, an average molecular weight of 380 and a viscosity range of 7000 to 10,000 centipoises), and 26.2 gms. of hexahydrophthalic acid anhydride with the addition of 0.25 gm. of the lithium salt of bis-α-hydroxy-tetrahydrobenzylphosphinic acid-tetrahydrobenzaldehyde acetal and cast to test bars (120 x 15 x 10 millimeters) at 40° C. The bars were heated at rest 20 hours at 110° C. and 5 hours at 150° C. Light yellow bodies were obtained which exhibited the following properties:

Ball indentation hardness _____ kg./cm.² __ 1500
Heat resistance (Martens, DIN 53,458) ____ ° C __ 120
Impact toughness (DIN 53,454) __ cm.-kg./cm.² __ 5.7

EXAMPLE VIII

Preparation of a hardened mixed epoxy resin 13.8 gms. of 7,8-epoxy-2-oxa-5-methyl-[4,6]-spirononane ($R_1=R_2=R_4=R_5=H$, $R_3=CH_3$) obtained according to Example II were mixed with 1.75 gms. of "Araldit F", 18.5 gms. of hexahydrophthalic acid anhydride and 0.08 gm. of the lithium salt of bis-α-hydroxy-tetrahydrobenzylphosphinic acid-tetrahydrobenzaldehyde acetal at 60° C. and cast into standard bars as in the preceding examples. The test pieces were left at rest 20 hours at 110° C. and 5 hours at 150° C. Light yellow test bars with excellent mechanical and thermal values resulted.

The preceding specific embodiments are illustrative of the invention. It is to be understood however that other expedients known to those skilled in the art may be employed without departing from the spirit of the invention or the scope of the appended claims.

We claim:

1. A hardenable composition of matter capable of being hardened by heating to temperatures between about 80° C. and 200° C. which consists essentially of from about 25 parts to about 75 parts by weight of an epoxy compound having the formula

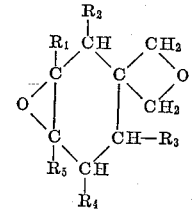

wherein $R_1$, $R_3$ and $R_5$ are members selected from the group consisting of hydrogen, halogen, lower alkyl and phenyl and $R_2$ and $R_4$ are members selected from the group consisting of hydrogen, halogen, lower alkyl, phenyl, and, when taken together, methylene, and the remainder to give 100 parts by weight of an organic acid compound selected from the group consisting of organic carboxylic acids having at least two carboxylic acid groups and carboxylic acid anhydrides thereof.

2. A hardenable composition of matter capable of being hardened by heating to temperatures between about 80° C. and 200° C. which consists essentially of about equimolar amounts of 6,7-epoxy-2-oxa-[4,6]-spirononane and hexahydrophthalic acid anhydride.

3. A hardenable composition of matter capable of being hardened by heating to temperatures between about 80° C. and 200° C. which consists essentially of from about 25 parts to about 75 parts by weight of an epoxy compound having the formula wherein $R_1$, $R_3$ and $R_5$ are members selected from the group consisting of hydrogen, halogen, lower alkyl and phenyl and R₂ and R₄ are members selected from the group consisting of hydrogen, halogen, lower alkyl, phenyl, and, when taken together, methylene, and the remainder to give 100 parts by weight of an organic acid compound selected from the group consisting of organic carboxylic acids having at least two carboxylic acid groups and carboxylic acid anhydrides thereof and 0.1% to 0.5% of the weight of the mixture of a material which accelerates the reaction.

4. A hardenable composition of matter capable of being hardened by heating to temperatures between about 80° C. and 200° C. which consists essentially of from about 25 parts to about 75 parts by weight of an epoxide composition containing an epoxy compound having the formula

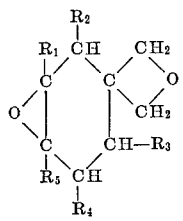

wherein R₁, R₃ and R₅ are members selected from the group consisting of hydrogen, halogen, lower alkyl and phenyl and R₂ and R₄ are members selected from the group consisting of hydrogen, halogen, lower alkyl, phenyl, and, when taken together, methylene, and from 0% to 100% by weight of said epoxy compound of a hardenable epoxy resin having more than one vicinal epoxy group per molecule, and the remainder to give 100 parts by weight of an organic acid compound selected from the group consisting of organic carboxylic acids having at least two carboxylic acid groups and carboxylic acid anhydrides thereof.

5. A hardenable composition of matter capable of being hardened by heating to temperatures between about 80° C. and 200° C. which consists essentially of from about 25 parts to about 75 parts by weight of an epoxide composition containing an epoxy compound having the formula

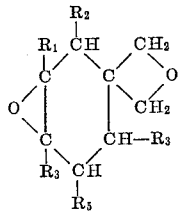

wherein R₁, R₃ and R₅ are members selected from the group consisting of hydrogen, halogen, lower alkyl and phenyl and R₂ and R₄ are members selected from the group consisting of hydrogen, halogen, lower alkyl, phenyl, and, when taken together, methylene, and from 0% to 100% by weight of said epoxy compound of a hardenable epoxy resin having more than one vicinal epoxy group per molecule, and the remainder to give 100 parts by weight of an organic acid compound selected from the group consisting of organic carboxylic acids having at least two carboxylic acid groups and carboxylic acid anhydrides thereof and 0.1 to 0.5% of the weight of the mixture of a material which accelerates the reaction.

6. A process for the production of a hardened synthetic resin which comprises reacting an epoxy compound having the formula

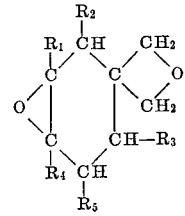

wherein R₁, R₃ and R₅ are members selected from the group consisting of hydrogen, halogen, lower alkyl and phenyl and R₂ and R₄ are members selected from the group consisting of hydrogen, halogen, lower alkyl, phenyl, and, when taken together, methylene, with an organic acid compound selected from the group consisting of organic carboxylic acids having at least two carboxylic acid groups and carboxylic acid anhydrides thereof at a temperature of between about 80° C. and about 200° C. for a time sufficient to harden and recovering said hardened synthetic resin.

7. The process of claim 6 wherein the said reaction is conducted at a temperature of about 80° C. to about 120° C. in a first step and at a temperature of about 150° C. to about 200° C. in a second step.

8. The process of claim 7 wherein after said first step, the reaction mixture is cooled and a solid, low molecular synthetic resin which is viscous at temperatures between about 80° C. and about 120° C., is recovered and subjected to said second step.

9. The process of claim 6 wherein 0.1% to 0.5% of the weight of the reaction mixture of a material which accelerates the reaction is added to said reaction mixture.

10. The process of claim 6 wherein up to 50% of said epoxy compound is replaced by another hardenable epoxy resin having more than one vicinal epoxy group per molecule.

11. The hardened synthetic resin produced by claim 6.

12. A process for the production of a solid, low molecular weight synthetic resin which is viscous at temperatures between about 80° C. and about 120° C. and which is capable of being hardened at temperatures between about 150° C. and 200° C. which comprises reacting an epoxy compound having the formula

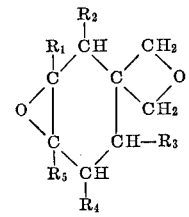

wherein R₁, R₃ and R₅ are members selected from the group consisting of hydrogen, halogen, lower alkyl and phenyl and R₂ and R₄ are members selected from the group consisting of hydrogen, halogen, lower alkyl, phenyl, and, when taken together, methylene, with an organic acid compound selected from the group consisting of organic carboxylic acids having at least two carboxylic acid groups and carboxylic acid anhydrides thereof at a temperature of between about 80° C. and about 120° C. for a time sufficient to form a viscous mass, cooling the reaction mixture and recovering said solid low molecular weight synthetic resin.

13. The solid, low molecular weight synthetic resin produced by claim 12.

References Cited
UNITED STATES PATENTS 3,138,618   6/1964   Nikles et al.

WILLIAM H. SHORT, Primary Examiner.

T. E. PERTILLA, Assistant Examiner.

UNITED STATES PATENT OFFICE
CERTIFICATE OF CORRECTION

Patent No. 3,388,105                June 11, 1968

Miklos Danielisz et al.

It is certified that error appears in the above identified patent and that said Letters Patent are hereby corrected as shown below:

Column 9, lines 50 to 58, the formula should appear as shown below:

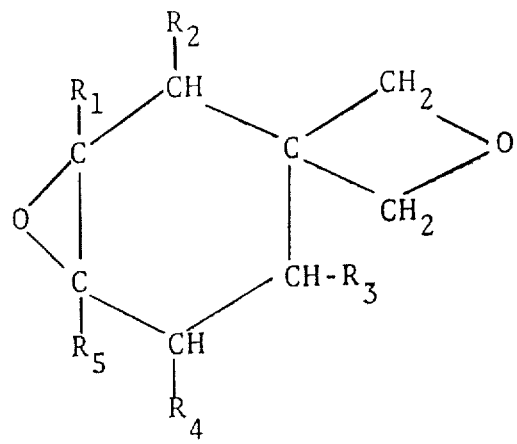

Column 10, lines 3 to 11, the formula should appear as shown below:

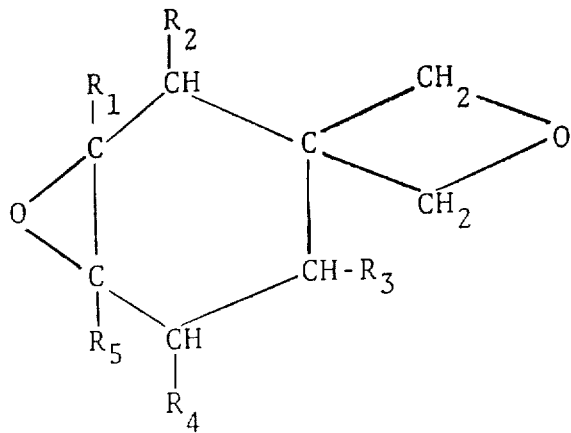

Signed and sealed this 24th day of March 1970.

(SEAL)
Attest:

EDWARD M. FLETCHER, JR.
Attesting Officer

WILLIAM E. SCHUYLER, JR.
Commissioner of Patents